United States Patent
Brand

(10) Patent No.: US 6,174,116 B1
(45) Date of Patent: Jan. 16, 2001

(54) ADJUSTABLE INTERLOCKING PANELS

(76) Inventor: Robert Stewart Brand, 241 Columbia Dr., Ladson, SC (US) 29456

( * ) Notice: Under 35 U.S.C. 154(b), the term of this patent shall be extended for 0 days.

(21) Appl. No.: 09/215,919

(22) Filed: Dec. 18, 1998

(51) Int. Cl.$^7$ ...................................................... B60P 7/14
(52) U.S. Cl. .......................... 410/140; 410/121; 410/129
(58) Field of Search ..................................... 410/121, 129, 410/140, 130; 296/24.1, 39.2, 39.1, 37.6; 220/507, 552; 52/586.1, 586.2, 589.1, 590.1, 590.2; 224/403, 404, 42.33, 42.34

(56) References Cited

U.S. PATENT DOCUMENTS

| | | |
|---|---|---|
| D. 392,938 | 3/1998 | Sylvester . |
| 3,410,441 | 11/1968 | Rhyne . |
| 3,847,299 | 11/1974 | Page . |
| 3,900,157 | 8/1975 | Roth . |
| 3,904,066 | 9/1975 | Wilson . |
| 4,079,852 | 3/1978 | Stoffregen . |
| 4,091,746 | 5/1978 | Kimbrough . |
| 4,423,978 | 1/1984 | Tiegelmann . |
| 4,639,161 | 1/1987 | Mazaki . |
| 4,772,165 | 9/1988 | Bartkus ................................ 410/139 |

(List continued on next page.)

FOREIGN PATENT DOCUMENTS 2249767   5/1992   (GB) ................................ 224/42.34

OTHER PUBLICATIONS

System Works! "Custom Closet Planner" hand-out brochure, 1 page.*
Rubbermaid Inc. 1998 magazine advertisement re polyethylene cabinets, 1 page.*
http://www.workingmat.com, 2 page advertisement for Working Mats.*
http://www.vanterior.com, Van–Terior Outfitters, Nets and Retainers ad, 1 page.*

* cited by examiner

Primary Examiner—Stephen T. Gordon
(74) Attorney, Agent, or Firm—Harleston Law Firm; Kathleen M. Harleston

(57) ABSTRACT

A system of adjustable interlockable panels for assembling a modular unit is provided, which comprises a plurality of rectangular, adjustable interlockable panels. Each panel has four edges: a first edge comprises a male sliding interlock, and a third, opposite edge comprises a female sliding interlock; a second edge comprises one or more adjustment slots; and an opposite, fourth edge, is a straight edge. The adjustment slots in the second edge are: parallel to the first and third edges; of a sufficient width to tightly accommodate any of the other panels in the system; and each slot extends between about ¼ and ¾ of the way into the panel. The male sliding interlock on a first panel is complementary to the female sliding interlock on a second panel in the system. The panels in this AIP system have approximately the same width and thickness; and each panel in the system is connectable, one at a time, with each of the other panels by removably sliding a first panel onto the complementary sliding interlock on a second panel so that the panels are connected end to end, or by removably inserting a first panel into an adjustment slot in a second panel such that the first panel is approximately at right angles to the second panel. Lastly, a user can assemble the modular unit or dissemble it without using tools.

19 Claims, 7 Drawing Sheets

U.S. PATENT DOCUMENTS

| | | | |
|---|---|---|---|
| 4,867,327 | * 9/1989 | Roland . | |
| 4,917,429 | 4/1990 | Giger | 296/37.6 |
| 5,265,993 | 11/1993 | Wayne | 410/129 |
| 5,322,335 | 6/1994 | Niemi . | |
| 5,417,020 | 5/1995 | Dobija . | |
| 5,423,463 | 6/1995 | Weeks | 224/42.34 X |
| 5,456,514 | 10/1995 | Justice . | |
| 5,466,058 | * 11/1995 | Chan . | |
| 5,502,939 | 4/1996 | Zadok et al. . | |
| 5,536,111 | 7/1996 | Doernemann | 52/570 X |
| 5,586,850 | 12/1996 | Johnson | 410/138 |
| 5,590,824 | 1/1997 | Weeks | 224/42.34 X |
| 5,671,857 | * 9/1997 | Stromberg . | |
| 5,697,742 | 12/1997 | House | 410/127 |
| 5,709,512 | 1/1998 | Smith | 410/129 |
| 5,713,649 | 2/1998 | Swift . | |
| 5,720,537 | 2/1998 | Lutz . | |
| 5,762,410 | 6/1998 | Lutz . | |
| 5,975,819 | 11/1999 | Cola | 410/129 |

| BOBTAIL INTERLOCKS | THROUGH BOBTAIL INTERLOCKS |
|---|---|
| STRAIGHT | STRAIGHT |
|  |  |
| ANGLED | ANGLED |
|  |  |
| CIRCULAR | CIRCULAR |

ADJUSTABLE INTERLOCKING PANELS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Technical Field

The present invention relates to a system of adjustable interlocking panels and a method for constructing a cargo barrier, shelving unit, box, and other modular systems with a plurality of such panels.

2. Background Information

Modular storage systems, furniture, shelving units, and containers in general are known in the prior art. These include free-standing stackable cubes that come from the manufacturer precut with the necessary hardware to join the parts of the cube. Knock-down and set-up construction is also known, particularly boxes, crates, and containers. Known cargo barriers, e.g. for placement in the load beds of pick-up trucks, include netting, load locks, Working Mats with flip-up panels, and grooves in the load bed that are designed to accept dimensional lumber.

What is needed is a versatile panel system with a sturdy yet quickly detachable interlocking system so that the consumer can quickly erect, modify, and breakdown various configurations without the need for tools. The present adjustable interlocking system can be used to build modifiable cargo barriers, boxes, shelving systems, and various other household constructions. The adjustable interlocking panels in the system have sliding interlocks at each end and adjustment grooves that are spaced apart to provide many compartment variations. The adjustable interlocking panels of the present invention join end-to-end and perpendicular to each other, and are easy to assemble and disassemble. This allows for repeated modification by the consumer. A storage assembly constructed from the adjustable interlocking system can be used lying down (e.g. for cargo barrier, toy, or stool applications) or standing upright (e.g. for organizer or shelving applications).

BRIEF SUMMARY OF THE INVENTION

The present invention is a system of adjustable interlockable panels for assembling a modular unit, which comprises a plurality of generally rectangular, adjustable interlockable panels. Each panel has four edges: a first edge comprises a male sliding interlock, and a third, opposite edge comprises a female sliding interlock; a second edge, which is approximately at right angles to the first and third edges, comprises one or more adjustment slots; and a fourth edge, which is opposite to the second edge, is a straight edge and does not comprise adjustment slots. The adjustment slots in the second edge are: parallel to the first and third edges; of a sufficient width to tightly accommodate any of the other panels in the system; and each slot extends between about ¼ and ¾, preferably ½, of the way into the panel. The male sliding interlock on a first panel is complementary to the female sliding interlock on a second panel in the system. The panels in this AIP system have approximately the same width and thickness; and each panel in the system is connectable, one at a time, with each of the other panels by removably sliding a first panel onto the complementary sliding interlock on a second panel so that the panels are connected end to end, or by removably inserting a first panel into an adjustment slot in a second panel such that the first panel is approximately at right angles to the second panel. Lastly, a user can assemble the modular unit or dissemble it without using tools. The modular unit is preferably a cargo barrier, shelving unit, box, or building toy with a plurality of such panels.

BRIEF DESCRIPTION OF THE SEVERAL VIEWS OF THE DRAWINGS

A more complete understanding of the invention and its advantages will be apparent from the following detailed description taken in conjunction with the accompanying drawings, wherein examples of the invention are shown, and wherein.

DETAILED DESCRIPTION OF THE INVENTION

Figure 1:
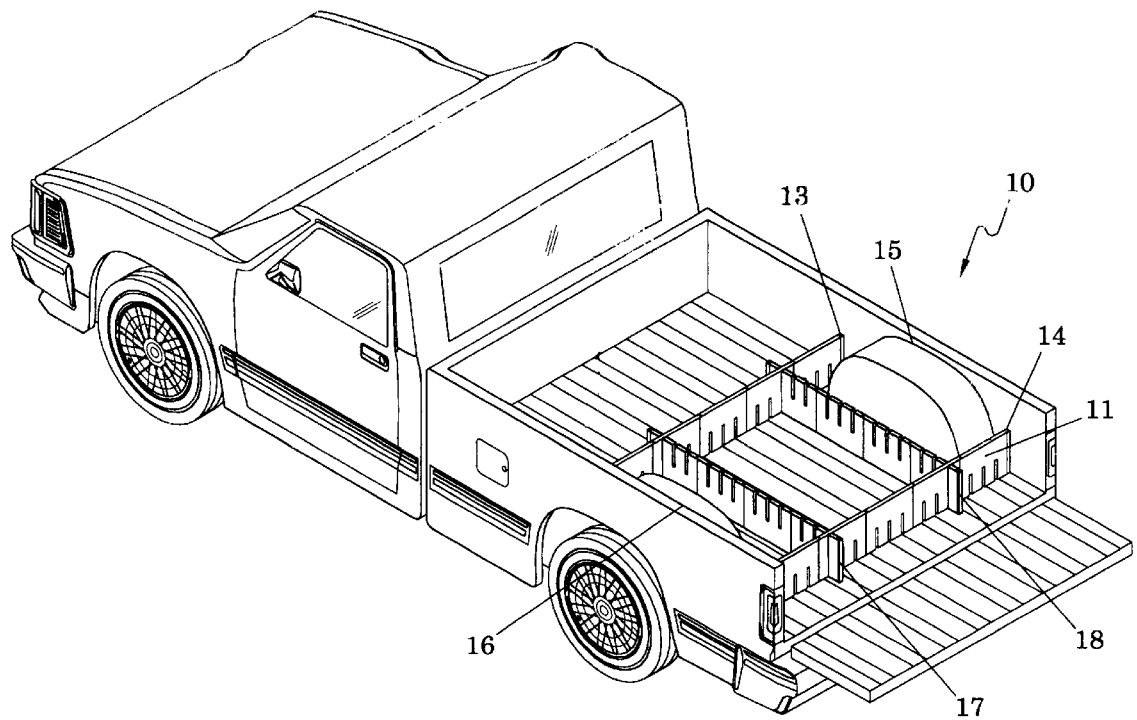
FIG. 1 shows a perspective view of a cargo barrier according to the present invention in the load bed of a pick-up truck.

In the following description, like reference characters designate like or corresponding parts throughout the several views. Also, in the following description, it is to be understood that such terms as "front," "back," within," and the like are words of convenience and are not to be construed as limiting terms. Referring in more detail to the drawings, the invention will now be described.

A preferred embodiment of the present invention is shown in FIG. 1. In FIG. 1, an adjustable interlocking panel system 10 forms a cargo barrier, which is shown in the bed of a pick-up truck. The adjustable interlocking panel (called herein "AIP") system of the present invention is preferably sold to consumers as a kit comprising a number of similarly shaped panels of the same or different lengths. These panels may be of different widths and thicknesses, though the panels within a kit preferably have the same width and thickness. The number and type of panels in a kit depend upon the anticipated end use(s) of the AIP system.

The panels of the various embodiments of the present invention are preferably made of wood, with or without laminates. The panels are more preferably made of ¼ to 1½, most preferably ¾, inch thick wooden boards. Alternatively, they can be made of a suitable sturdy plastic, such as the molded plastic used in children's' playhouses and play castles. They can also be made of a suitable metal combination. The panels are ordinarily rectangular in shape, and the dimensions vary according to the use intended (i.e., type of kit) for the particular AIP system.

The AIP system 10 comprises one or more, preferably a plurality, of individual adjustable interlockable panels 11. In the present invention, one or more edges of each adjustable interlocking panel comprises a male or female portion of a joint. The user can removably connect the panels to each other by sliding the male joint portion of a first adjustable interlockable panel into a corresponding female joint portion of a second adjustable interlockable panel. Preferably, each panel has two opposite edges, each of which is the male or female portion of a joint. A series of panels can be strung together in a line in this manner to form a longer panel, as shown in FIG. 1. Four such long panel segments, each comprising shorter panels 11, make up the cargo barrier shown in FIG. 1. The joints of a set of panels in an AIP system are made to fit each other, so that the panels can be tightly but removably joined to each other.

Figure 2:
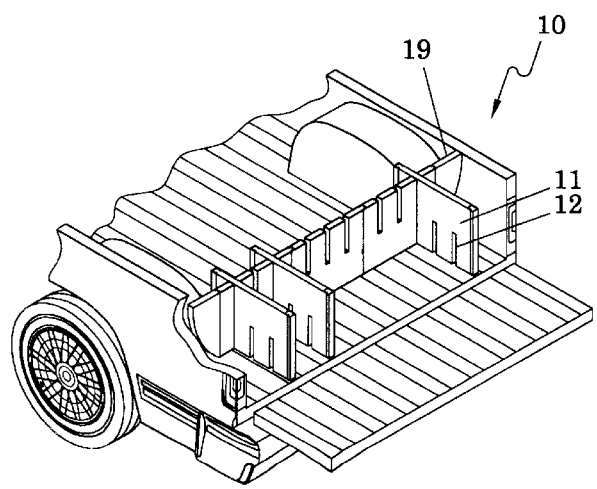
FIG. 2 is a perspective view of a cargo barrier according to the present invention in the load bed of a pick-up truck.

As shown in FIGS. 1 and 2, each panel 11 of the present invention preferably also comprises one or more adjustment slots 12. Each adjustment slot 12 extends about ¼ to ¾, preferably about half, of the way into the panel. The adjustment slots 12 are preferably parallel to the ends of the panel 11. A first panel can be removably inserted into the adjustment slot in a second panel such that the first panel is perpendicular to the second panel. Preferably, each panel 11 comprises a plurality of adjustment slots 12 which are equidistant and on the same side of the panel, so that the adjustment slots on a panel all open on the same side. The adjustment slot should be slightly wider than, or equal to, the thickness of the panel to be inserted into the adjustment slot. Alternatively and less preferably, in order to provide a friction fit, the adjustment slot may be slightly narrower than the thickness of the panel to be inserted.

In FIG. 1, opposite ends of two of the long panel segments have been placed into the slots of the other two long panel segments, so that a rectangular shape has been formed. The two long panel segments 13 (first), 14 (second) lying across the truck bed parallel to each other preferably fit snugly between the walls of the pick-up bed. These segments are preferably placed on opposite ends of the truck's wheel wells 15, 16. Each end panel of these two long panel segments is preferably cut in a curved shape as shown in FIG. 2 so that the long panel segments fit snugly against the load bed walls of most standard pick-up trucks. This is so that the cargo barrier does not shift while the truck is in motion, and items inside the cargo barrier can easily be accessed by a person standing at the truck gate. The other two long panel segments 17 (first), 18 (second) in FIG. 1 are perpendicular to the first two long panel segments 13, 14 and may extend the entire length of the load bed to provide added support. These second two long panel segments 17, 18 can be placed in any two adjustment slots 12 which are opposite to each other in the first two panel segments 13, 14 so that a box shaped stowage compartment is formed of the desired size.

In the cargo barrier shown in FIG. 2, a first long panel segment with curved ends 19 fits against the load bed walls on either side of the opposite wheel wells. Several individual panels 11 have been placed into slots 12 in the curved-end long panel segment 19 so that the individual panels 11 are perpendicular to the curved-end long panel segment 19. When the truck gate is in a closed position, several box-shaped compartments are formed. The user can stow various items in these compartments, such as filled grocery or department bags, tools, equipment, and containers of various sorts. The containers, etc. are less likely to slide across the truck or spill as the truck turns or goes over bumps. The present system allows more efficient and wider use of truck bed space. The user can move or add panels as desired to the system to form different modular shapes to hold the different items being stored in the truck bed.

The AIP system is also useful for constructing furniture (e.g. cabinets, step stools), shelving units (e.g. book shelves, stacking cubes, closet organizers, shoe stackers), boxes (e.g. shadow boxes for hanging on walls), steps, or "building block" toys. Importantly, the adjustable interlockable panels can quickly and easily be taken apart by the user and remade into a different configuration to serve a different function.

Figure 3:
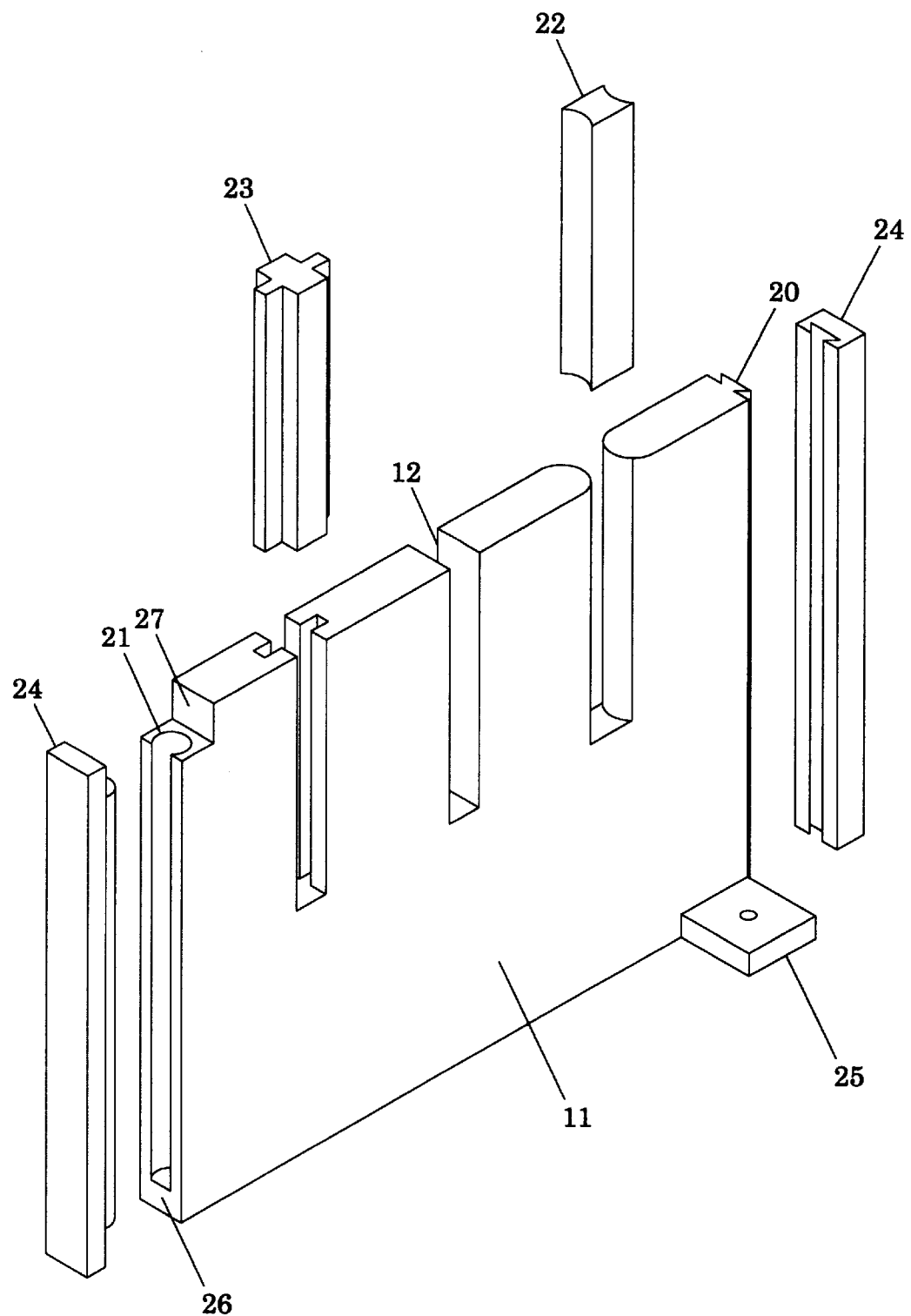
FIG. 3 is a perspective view of an adjustable interlockable panel according to the present invention.
Figure 16:
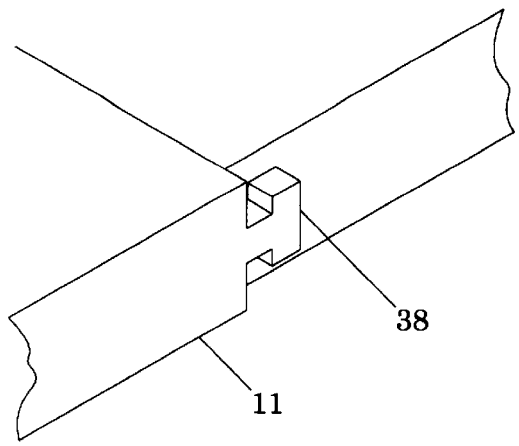
FIG. 16 is a perspective view of a bobtail sliding interlock according to the present invention.
Figure 17:
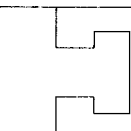
FIG. 17 is a table showing alternative sliding interlocks according to the present invention.
Figure 17:
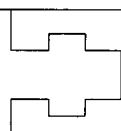
Figure 17:
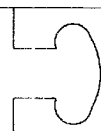
Figure 17:
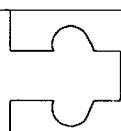

Referring to FIG. 3, there are several preferred types of joints at the end(s) of the individual adjustable interlocking panels 11. These are sliding interlocks for joining the various individual panels 11 into long panel segments. The sliding interlocks are key to the quick and easy knock-down and set-up of the AIP system by the user. The type of sliding interlock chosen depends upon the intended function for the system. The sliding interlock may be, but is not limited to, dovetail, circular or bobtail interlock. A dovetail interlock 20 is shown at one end of the panel 11 in FIG. 3. At the opposite end of the panel 11, a circular interlock 21 is shown. Additionally, one of the bobtail interlocks as shown in FIGS. 16 and 17 could be employed. The individual panels 11 preferably have a sliding interlock at each of its two ends. The sliding interlock ordinarily extends the length of the panel edge, but sliding interlock segments along the edge of the panels can be used.

Once the user has constructed the desired item using the AIP system, he or she may wish to insert filler strips 22, 23 into adjustment slots 12. These filler strips are cut to fit into the adjustment slots, as shown in FIG. 3. Filler strips, and corresponding adjustment slots, may be, but are not limited to, bead and cove 22, and tongue and groove 23. Rounding over the edges of the panel including the adjustment slot will occasionally be required and could facilitate assembly as well as provide a different appearance.

Panel end caps 24 are optionally used to cover the exposed portions of sliding interlock 20, 21 at the ends of panel segments, as shown in FIG. 3. These serve two purposes: aesthetics (clean appearance), and to cover the exposed rough edges (the sliding interlock) which may injure people, pets, or property.

Figure 4:
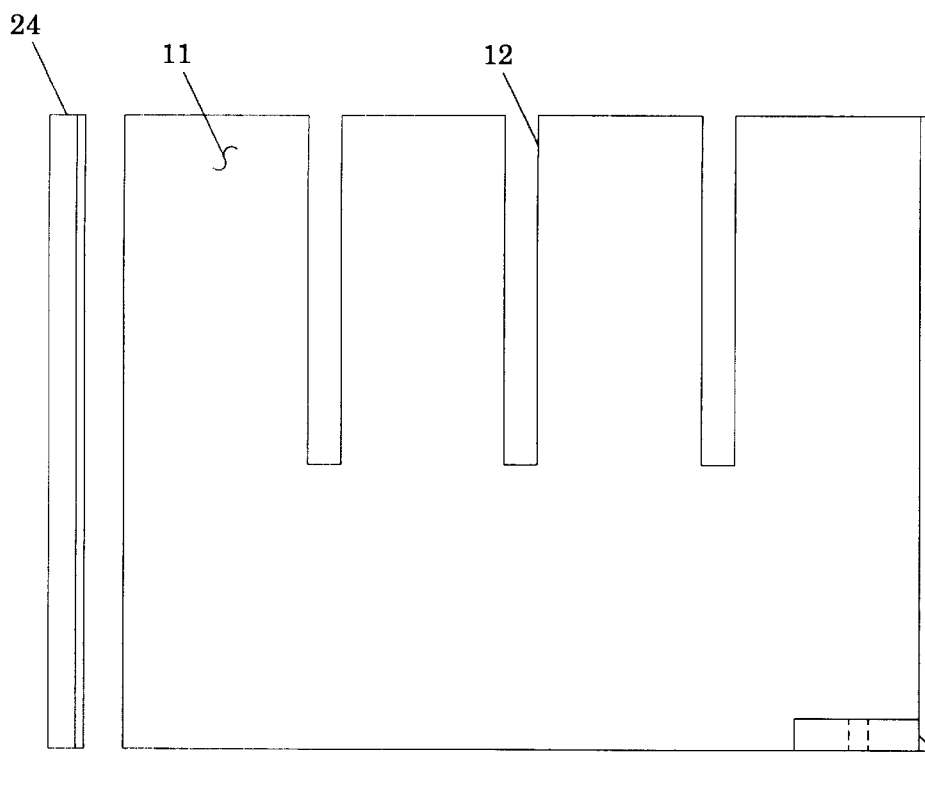
FIG. 4 is an elevational view of an adjustable interlockable panel according to the present invention.
Figure 5:
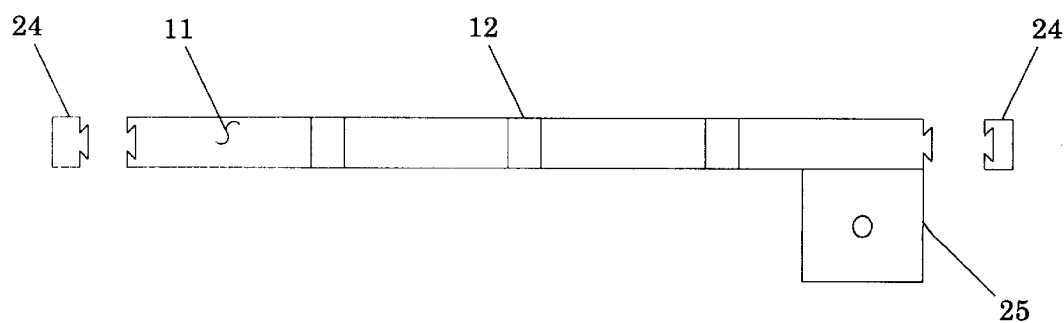
FIG. 5 is a plan view of an adjustable interlockable panel according to the present invention.

One or more panels 11 in the AIP system may optionally comprise an anchoring tab 25, as shown in FIG. 3. The anchoring tab 25, which preferably comprises a central hole, can be used to screw the panel down, for example onto a plank, where the AIP system is being used on its side (e.g., cargo barrier). The anchoring tab 25 is preferably used to anchor the AIP system when the system is being used in an upright position, for example, in attaching an organizer to a wall. FIGS. 4 and 5 show a panel 11, anchoring tab 25, and panel end cap 24.

Referring again to FIG. 3, sliding interlocks herein are preferably blind 26, segmented, and/or recessed 27 into the panel. By "blind" 26 is meant that the interlock does not pass all of the way through the end edge of the panel. This allows the interlock to be hidden on that outside end. The interlock can also be recessed 27, or set in, from the outside edge of the panel to help prevent the joint from being damaged. This is useful, for example, where a user is sliding items on the top of the panel, such as plywood being loaded across the top of a cargo barrier. Sliding interlocks can be in various arrangements including: a) female on one side, male on the other, b) double female, c) double male, d) single female, or e) single male.

Figure 6:
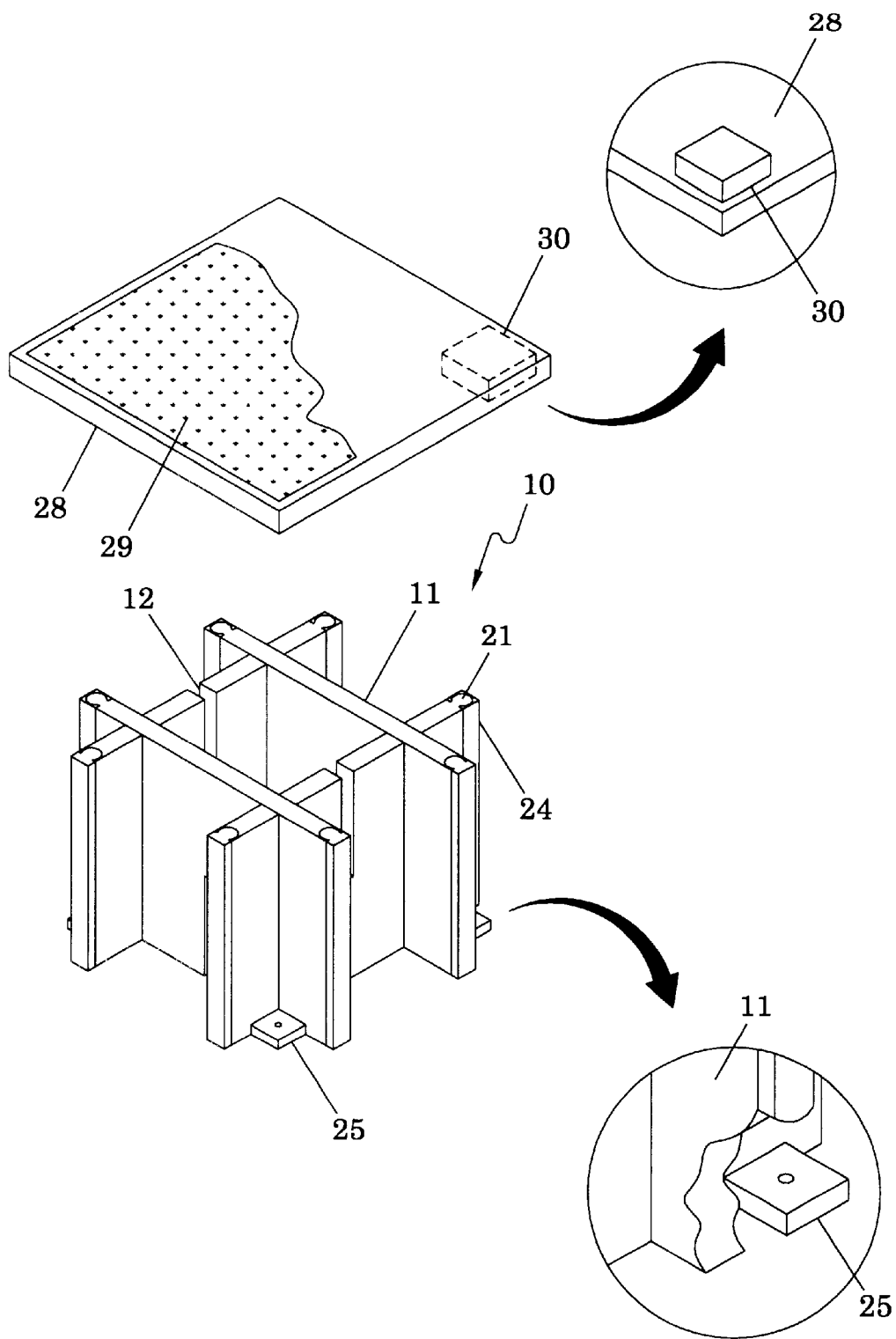
FIG. 6 is a perspective view of an adjustable interlocking panel system according to the present invention, in the form of a box.

In FIG. 6, a box or stool has been constructed using four adjustable interlocking panels 11. First panels have been placed into adjustment slots 12 in second panels at right angles so that a box is formed. Panel end caps 24 have been placed on all exposed circular interlocks 21. The box can be covered with a cover 28 so that the box may be used as a stool or seat. The cover 28 is covered with a non-skid surface 29 so that the stool can be stepped on or sat on. Two or four cover tabs 30 are provided at the bottom of the cover 28 so that the cover is less likely to slip off the base box. A cover tab 30 is shown in the upper inset in FIG. 6 (rotated for clarity). Alternatively, the box could be mounted on a wall using the anchoring tabs 25, which is shown in the FIG. 6 lower inset, as a decorative shadow box. Filler strips could be inserted into the unused adjustment slots.

Figure 7:
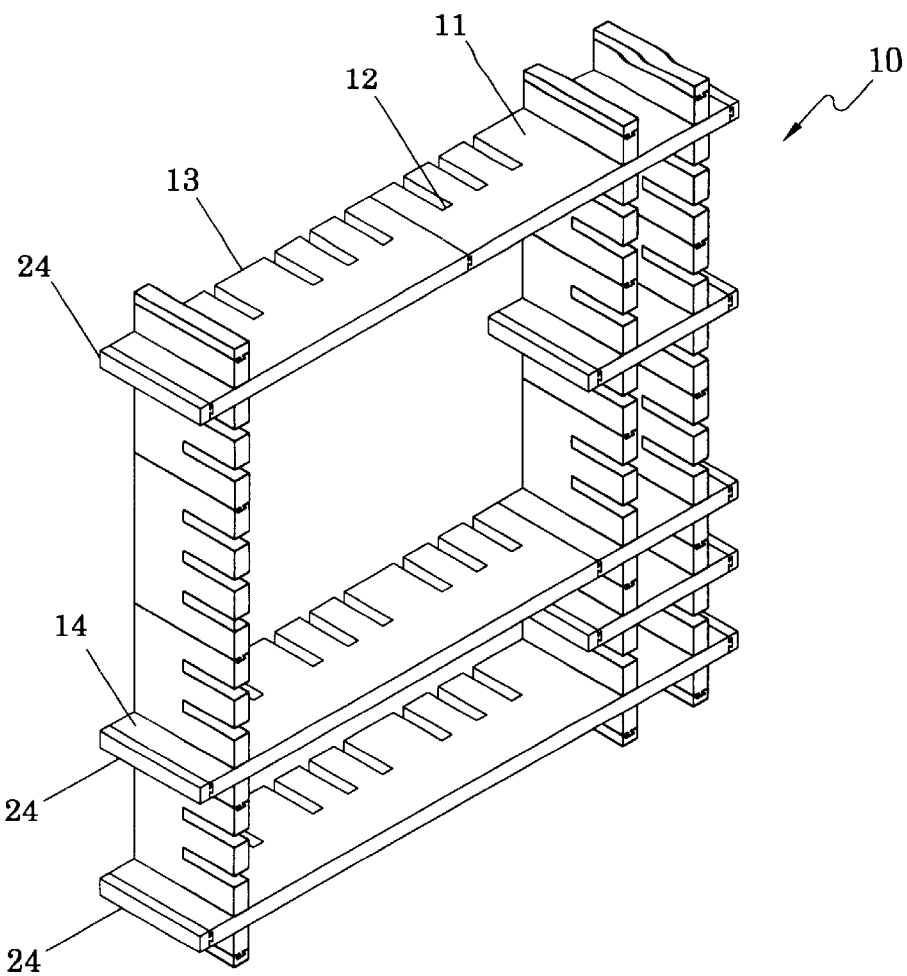
FIG. 7 is a perspective view of an adjustable interlocking panel system according to the present invention, in the form of a shelving unit.

Referring to FIG. 7, an adjustment interlocking system 10 has been used to construct a versatile shelving unit, which could be used, for example, as a book shelf, with a section for CDs, or a closet organizer. Individual panels 11 have been interlocked to form long panel segments 13, 14. The bottom-most panel is a single adjustable interlocking panel 11. Panel end caps 24 cover exposed panel ends.

Figures 8, 9:
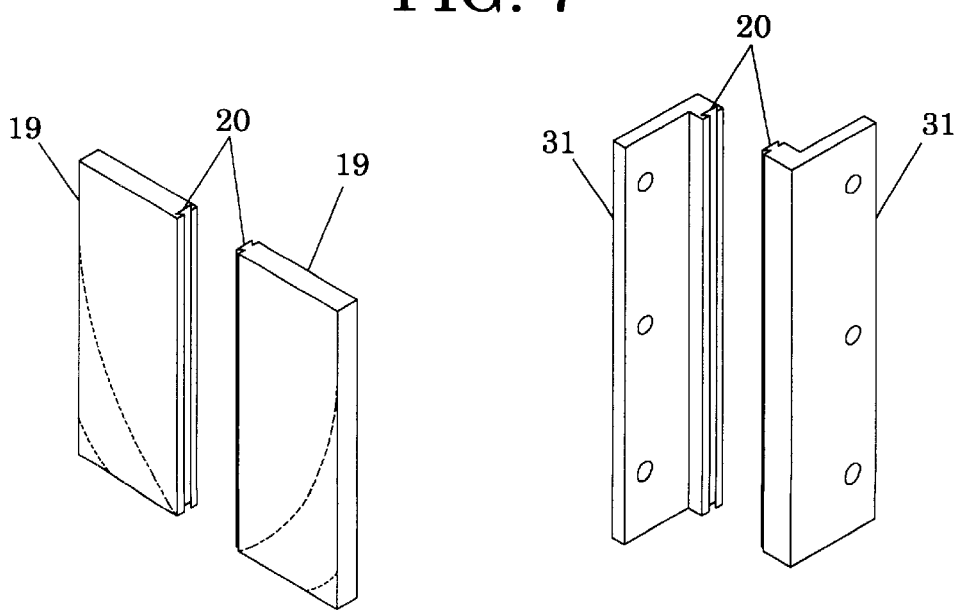
FIG. 8 is a perspective view of two modifiable end panels according to the present invention.
FIG. 9 is a perspective view of two attachment end caps according to the present invention.

FIG. 8 shows a modifiable end panel with cut marks (dotted lines) for making curved-end adjustable interlockable panels 19. These individual panels can be used on opposite ends of a long panel segment so that the long panel segment will fit against opposite load bed walls when the AIP system is used across a pick-up bed as a cargo barrier (see also FIG. 2). The curved-end panels 19 have one edge with a sliding interlock 20 for connection to an adjacent panel in a long panel segment. Preferably, an AIP system kit for constructing a cargo barrier comprises modifiable panels. These panels may be trimmed to allow the barrier to fit securely in grooves which are provided by some vehicle manufacturers in pick-up truck load beds. Alternatively, an AIP system kit for constructing a cargo barrier in a sports utility vehicle (SUV) preferably includes modifiable panels which can be trimmed to fit neatly behind the seat in the sports utility vehicle.

Referring to FIG. 9, attachment end caps 31 can be slidably interlocked on a corresponding interlock 20 on the end of a panel 11. These are used to mount a panel, panel segment, or AIP system configuration to, for example, a wall in a house. Male and female attachment end caps are shown in FIG. 9.

In addition to adjustable interlockable panels 11, filler strips 22, 23, end caps 24, curved-end adjustable interlockable panels 19, and attachment end caps 31, AIP system kits may include baseboard cut-outs to hold certain configurations tight to a wall, doors, and/or drawers, and the individual panels may include decorative molding. The AIP system can be equipped with a variety of accessories to improve the function, fit, and appearance of the resulting assemblies, and can be assembled without tools.

Figure 10:
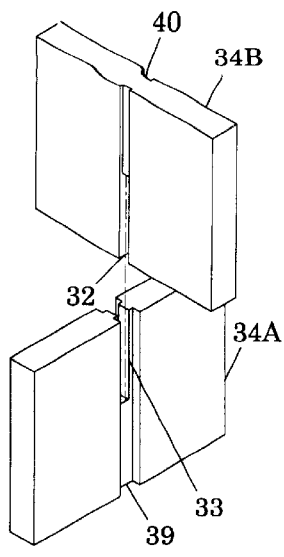
FIG. 10 is a perspective view of two adjustable interlockable panels according to the present invention, showing a modified half lap interlock.
Figure 11:
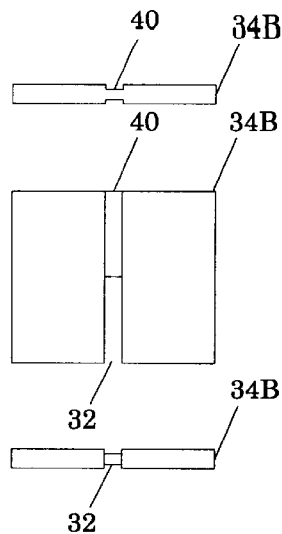
FIG. 11 shows plan and elevational views of the top adjustable interlockable panel in FIG. 10.
Figure 12:
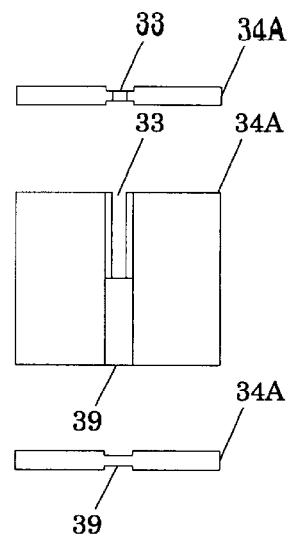
FIG. 12 shows plan and elevational views of the bottom adjustable interlockable panel in FIG. 10.

FIG. 10 illustrates two adjustable interlockable panels with corresponding male and female modified half lap adjustment slots 32, 33. The adjustable interlockable panel 34B shown at the top of FIG. 10 fits down at a right angle into the adjustable interlockable panel 34A shown at the bottom of the same figure. The slots shown are corresponding modified half lap adjustment slots 32, 33. This type of slot is employed in the present invention to add strength to the AIP system configuration. In FIG. 11, top plan, front, and bottom plan views of adjustable interlockable panel 34B are shown. Top plan, front, and bottom plan views of adjustable interlockable panel 34A are shown in FIG. 12.

Figure 13:
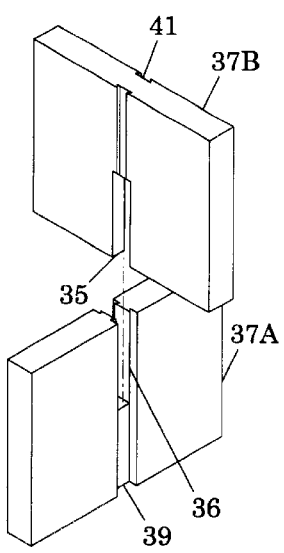
FIG. 13 is a perspective view of two adjustable interlockable panels according to the present invention, showing a locking modified half lap interlock.
Figure 14:
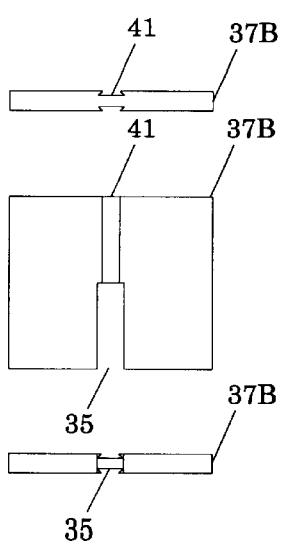
FIG. 14 shows plan and elevational views of the top adjustable interlockable panel in FIG. 13.
Figure 15:
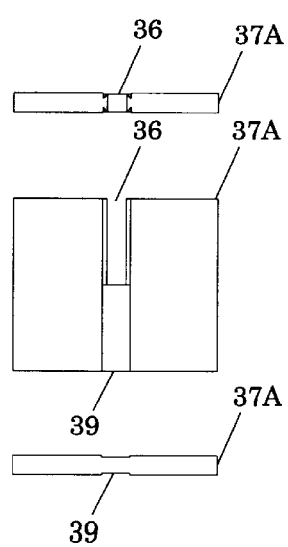
FIG. 15 shows plan and elevational views of the bottom adjustable interlockable panel in FIG. 13.

Referring to FIG. 13, two adjustable interlockable panels with corresponding locking modified half lap adjustment slots are shown as in FIG. 10. The top adjustable interlockable panel 37B fits down at a right angle into the bottom adjustable interlockable panel 37A. Here, the corresponding adjustment slots are locking modified half lap adjustment slots 35, 36. This adds additional strength to the AIP system configuration. In FIG. 14, top plan, front, and bottom plan views of adjustable interlockable panel 37B are shown. Top plan, front, and bottom plan views of adjustable interlockable panel 37A are shown in FIG. 15. Adjustment slots therefore are preferably: a) modified half lap, b) locking modified half lap, or c) half lap. The innovative modified half lap adjustment slot has grooves that are narrower than the panel and additional cuts to support the joint, thereby adding strength and allowing the final assembly to stand alone.

Alternative types of sliding interlocks suitable for use herein are dovetail, circular, "bobtail," and "through bobtail." These have been created for the present invention for joining panels end to end. These interlocks are used in this invention because strength and sturdiness is desirable, e.g., where the long panel segments will bear weight. The interlocks must be tight enough to support weight, yet not so tight that they cannot be broken down by the consumer. Here, a balance has been struck, so that the AIP system is sturdy, yet easily set-up and broken down by the user.

Preferably, each panel comprises at least two slots along the same second edges or sides so that when the panels are interconnected, the slotted sides on the lengthwise panels all face up while the slotted second sides on the cross-piece panels all face down.

Referring to FIG. 16, a bobtail sliding interlock 38 according to the present invention is shown along the edge of a panel 11. FIG. 17 is a table showing alternative "bobtail," and "through bobtail" sliding interlocks. The innovative "bobtail" sliding interlock resembles a tongue and groove joint with a locking mechanism located along the slot.

In the event that multiple interlocks are required to carry a significant weight, the "bobtail" joint would be preferred in the present invention because it is stronger than the simpler dovetail or circular interlocks. The "through bobtail" joint is believed to be even stronger. Gluing of the interlocks would preclude knock-down although it adds strength to the interlock. The use of "mending plates" across the interlocks would also add strength and retain knock-down capabilities.

The modified half lap adjustment slot is preferably used to provide additional strength and rigidity to heavy duty or stand-alone assemblies. Two different panel configurations are preferred for stand alone assemblies. Panel A (34A) would have adjustment slots 33 that run parallel to the sliding interlock and pass approximately halfway through the panel, but their width would be significantly less than the thickness of the material used. As shown in FIGS. 10 and 12, a secondary shoulder slot 39 whose width would be approximately the thickness of the material used would pass from the top to the bottom of Panel A (34A) on each side and be centered with the first adjustment slot 33 in Panel A (34A). The depth of the secondary shoulder slot 39 would be such that it reduces the remaining material to a thickness approximating the width of the first adjustment slot 33.

Panel B (34B) likewise would have adjustment slots 32 that run parallel to the sliding interlocks and pass approximately half way through the panel with a width approximating its counterpart 33 on Panel A (34A). However, the secondary shoulder slot 40 for Panel B (34B) would only be as wide as the first adjustment slot 32 as shown in FIGS. 10 and 11. Again the depth of the secondary shoulder slot 40 would be such that it reduces the remaining material to a thickness approximating the width of the first adjustment slot 32. When the two panels are interlocked, the resulting joint is supported across its entire length and contact surface area has dramatically increased. Finally, a locking modified half lap interlock can be created by dovetailing the first adjustment slot 36 of Panel A (37A), and dovetailing a secondary shoulder slot 41 of Panel B (37B) as shown in FIGS. 13 and 14. A locking modified half lap interlock is supported across its length, has increased contact area, and Panels A and B are now locked rigidly together.

"Accessories" for the AIP system include, but are not limited to:

a. Decorative end caps—to decorate exposed interlocks;
b. End caps—to cover exposed interlocks;
c. Modifiable end caps—allow for irregular contours and angles;
d. Attachment end caps—allow sides to be attached to surfaces;
e. Anchoring tab—to anchor assemblies to a surface;
f. Stool cover—with locks to prevent sliding and a non-skid surface for safety;
g. Adjustment groove supports—for very heavy applications the adjustment slot tangs may require additional support. Conceivably, a locking mechanism may also be required to prevent inadvertent panel removal;
h. Back panel—would add stability;
i. Base board cutouts—on only a few panels to bring the assembly tight to a wall;
j. Cabinet doors—may be hinged to the front of an assembly to enhance appearance;
k. Drawers; and
l. Decorative molding—can be integral to each panel or glued or tacked to the face of the assembly to enhance appearance. Alternatively, a female groove could be supplied on the face to accept a male counterpart on the back of the decorative molding.

When used in vehicle applications, a plurality of adjustable interlockable panels are interlocked end to end to form a barrier across the load space. Modifiable end caps may be cut to fit irregular contours and interlocked to the ends of the resulting barrier. By inverting more adjustable interlockable panels and sliding them into the adjustment slots at selected intervals, the barrier is held upright on its edge. The entire load space can be compartmentalized with a sufficient number of adjustable interlockable panels to provide support for loading bulky items, such as plywood and sheetrock, into sports utility vehicles, vans, minivans, and pick-up trucks. Furthermore, an assembly could be attached, via the optional anchoring tabs, to a sheet of plywood, enabling the user to remove the entire unit and carry it to another location. By linking four or more adjustable interlockable panels together with the adjustment slots only, a stool can be created that would accept a stool cover equipped with locks and a non-skid surface. The user now has a sturdy seat or step stool to use to wash and wax the high parts of a vehicle, or to work under the hood, for example. Because vehicle applications may be exposed to the weather and be in the proximity of children and pets, the adjustable interlockable panels in this application are preferably made of plastic with rounded edges. By simply making the adjustable interlockable panels smaller, it is conceivable that even the trunks of cars could be compartmentalized by this system. Since knock-down and rearrangement will likely occur often, the interlocks should not be overly tight.

Home applications include, but are not limited to, organizers (e.g., for closets, cabinets, cupboards, pantries, garages), shelving, stools, steps, boxes, entertainment centers, and even toys. Unlike vehicle applications, the resulting assemblies could be stood upright and attached to a surface with existing technology or by using adjustable interlockable panels equipped with the optional anchoring tab or attachment end caps. Assemblies may be dressed out by using one or more of the accessories listed. This system allows the user to develop his or her own design and modify it as desired. The AIP system requires no tools to assemble and could be mounted in place with only a screwdriver. In order to be free-standing, the interlocks and adjustment slots are preferably snug with little or no rounding over, or they may include the "bobtail" joinery in conjunction with one of the modified half lap joints.

A kit of the present invention may include movable components such as drawers. Modular assemblies made with these kits may be combinations, such as arrangements of shelves, cabinets, and/or an interposed table. The present kit is suitable for constructing larger modular units, such as book shelves, and may be "downsized" into kits for smaller modular units, such as shelves for cupboards or cabinets. Modular assemblies herein may be free-standing or attached. They may, for example, be hung on a wall, or leaned against a wall or truck load bed.

The joints of the present invention are not put together straight in by "rock and lock," and do not require gluing. The present male sliding interlock slides into the female sliding interlock top to bottom, with the preferred blind sliding interlock 26 stopping downward motion (see FIG. 3). The sliding interlocks of the present invention fit closely and are therefore snug and strong. The sliding interlocks are integral to each panel; no third part is needed to join two panels of the present invention together. Grooves on the adjustable interlocking panels are not necessary for joining the panels to each other and are preferably not included. The panels of the present invention are easily attached and detached by the user; the joints are sturdy but not permanent. The adjustable slots of the present invention allow adjustment of heights of the long panel segments placed cross-wise across the lengthwise long panel segments, and the AIP kit for constructing a modular shelving unit allows full shelf construction to result.

In summary, a kit for constructing modular assemblies is also described herein. The kit comprises three or more generally rectangular-shaped panels; each panel having a thickness which is substantially less than its width or length; and comprising two opposite first sides, and two opposite second sides which are adjacent to the first sides. Of these panels, a first panel comprises a male sliding interlock along a first side, and a second panel comprises a female sliding interlock along a first side. The male and female sliding interlocks fitting together to removably join the first and second panels end to end. Each panel further comprises at least one slot along a second side. Each slot extends approximately halfway into the panel, and is parallel to the first sides of the panel. Each slot is of a width sufficient to accommodate a third panel. The present kit comprises a sufficient number of panels to form the modular assembly, which is preferably a toy with a plurality of panels for assembly and dissembly by a child, a modifiable cargo barrier with at least six panels, or a knockdown shelving unit comprising between six and 20 panels. Alternatively, the kit may comprise about four panels, two lengthwise and two crosswise, which when assembled form a knockdown box, and a cover which fits over the assembled panels. Interestingly, these modular assemblies can be assembled and dissembled by a user without the use of tools.

In this kit, a plurality of the panels preferably comprise a male sliding interlock on a first side and a female sliding interlock on the opposite first side, and wherein all of the panels fit together to form a modular assembly. Each panel preferably comprises between two and ten, most preferably four, equidistant slots of equal length. The sliding interlocks are preferably dovetail, circular or bobtail interlocks. Bobtail or through bobtail interlocks are most preferred. The sliding interlocks herein are preferably blind, segmented or recessed (most preferred) into the panels. The adjustment slots are half lap, modified half lap, or locking modified half lap (most preferred). The present kit preferably further comprises a modifiable end cap, an attachment end cap, and/or an anchoring tab.

From the foregoing it can be realized that the described device of the present invention may be easily and conveniently utilized. While preferred embodiments of the invention have been described using specific terms, this description is for illustrative purposes only. It will be apparent to those of ordinary skill in the art that various modifications may be made without departing from the spirit or scope of the invention, and that such modifications are intended to be within the scope of the present invention.

BRIEF LIST OF REFERENCE NUMBERS USED IN THE DRAWINGS

| 10 | adjustable interlocking panel system |
|---|---|
| 11 | adjustable interlockable panel |
| 12 | adjustment slot |
| 13 | first long panel segment (1st) |
| 14 | first long panel segment (2nd) |
| 15 | wheel well |
| 16 | opposite wheel well |

-continued

BRIEF LIST OF REFERENCE NUMBERS USED IN THE DRAWINGS

| 17 | second long panel segment (1st) |
|---|---|
| 18 | second long panel segment (2nd) |
| 19 | curved-end adjustable interlockable panel |
| 20 | dovetail interlock |
| 21 | circular interlock |
| 22 | bead and cove filler strip |
| 23 | tongue and groove filler strip |
| 24 | panel end cap |
| 25 | anchoring tab |
| 26 | blind sliding interlock |
| 27 | recessed sliding interlock |
| 28 | cover |
| 29 | non-skid surface |
| 30 | cover tab |
| 31 | attachment end caps |
| 32 | modified half lap adjustment slot in panel 34B |
| 33 | modified half lap adjustment slot in panel 34A |
| 34 | panel with modified half lap adjustment slot |
| 35 | locking modified half lap adjustment slot in panel 37B |
| 36 | locking modified half lap adjustment slot in panel 37A |
| 37 | panel with locking modified half lap adjustment slot |
| 38 | bobtail sliding interlock |
| 39 | secondary shoulder slot in panel 34A, 37A |
| 40 | secondary shoulder slot in panel 34B |
| 41 | secondary shoulder slot in panel 37B |

What is claimed is:

1. A system of adjustable interlockable panels for assembling a modular unit, the system comprising: a plurality of generally rectangular-shaped, adjustable interlockable panels, each of said panels having four edges;

wherein a first of said edges comprises a male sliding interlock, and a third of said edges, which is opposite to said first edge, comprises a female sliding interlock; wherein a second of said edges, which is approximately at right angles to the first and third edges, comprises one or more adjustment slots; and wherein a fourth of said edges, which is opposite to said second edge, is a straight edge;

wherein each adjustment slot in said second edge is parallel to said first and third edges; wherein said adjustment slots are of a sufficient width to tightly accommodate any of said other panels in said system; wherein each adjustment slot extends between about ¼ and ¾ of the way into said panel; and wherein said male sliding interlock on a first one of said panels is complementary to said female sliding interlock on a second one of said panels in said system; wherein said panels in said system have approximately the same width and thickness; wherein each panel in said system is connectable with each of said other panels by removably sliding a first one of said panels onto a complementary sliding interlock on a second one of said panels so that said panels are connected end-to-end, or by removably inserting a fist one of said panels into one of said adjustment slots in a second one of said panels; and wherein said system is adapted so that a user can assemble a modular unit or dissemble it without using tools.

2. A system according to claim 1, wherein said adjustment slots are modified half lap, or locking modified half lap.

3. A system according to claim 2, wherein said sliding interlocks are bobtail or through bobtail interlocks.

4. A kit for constructing modular assemblies, said kit comprising three or more generally rectangular-shaped panels; each panel having a thickness which is substantially less than its width or length; each panel comprising two opposite first sides, and two opposite second sides which are adjacent to said first sides:

(a) wherein a first one of said panels comprises a male sliding interlock along a first one of said sides, and a second one of said panels comprises a female sliding interlock along one of said first sides, said male and female sliding interlocks fitting together to removably join said first and second panels end to end; and (b) each panel comprising at least one slot along a second one of said sides, each slot extending approximately halfway into said panel, each slot being parallel to said first sides of said panel, each slot being of a width sufficient to accommodate a third one of said panels.

5. A system according to claim 1, wherein said sliding interlocks are straight, angled, or circular through bobtail interlocks.

6. A kit according to claim 4, wherein said slots are of equal length and there are between two and ten slots on each of said panels.

7. A toy kit according to claim 4, where said panels are adapted for assembly and dissembly by a child.

8. A kit according to claim 6, wherein said sliding interlocks are dovetail, circular or bobtail interlocks.

9. A kit according to claim 8, wherein each adjustment slot is a half lap, modified half lap, or locking modified half lap.

10. A kit according to claim 8, wherein said sliding interlocks are blind, segmented or recessed into said panels.

11. A kit according to claim 10, further comprising a panel end cap, or an attachment end cap, which are each removably attachable to one of said complementary sliding interlocks; or an anchoring tab, which is affixable at a right angle to one of said edges of one of said panels.

12. A kit according to claim 8, wherein said sliding interlocks are bobtail or through bobtail interlocks.

13. A kit according to claim 8, wherein about four of said panels, two lengthwise and two crosswise, form a knockdown box having a cover which fits over said knockdown box.

14. A kit according to claim 8, wherein at least six of said panels form a modifiable cargo barrier.

15. A kit according to claim 8, wherein between six and 20 of said panels form a knockdown shelving unit.

16. A kit according to claim 15, wherein at lease one of said sliding interlocks is an angled through bobtail interlock.

17. A system according to claim 2, wherein said sliding interlocks are straight, angled, or circular bobtail interlocks.

18. A kit according to claim 4, wherein at least one of said sliding interlocks is a straight, angled, or circular through bobtail interlock.

19. A kit according to claim 6, wherein at least one of said sliding interlocks is an angled or circular bobtail interlock.

* * * * *